Feb. 6, 1934. W. I. NICHOLSON, JR 1,945,655
SALES AND BILLING MACHINE
Original Filed March 27, 1931 5 Sheets-Sheet 1
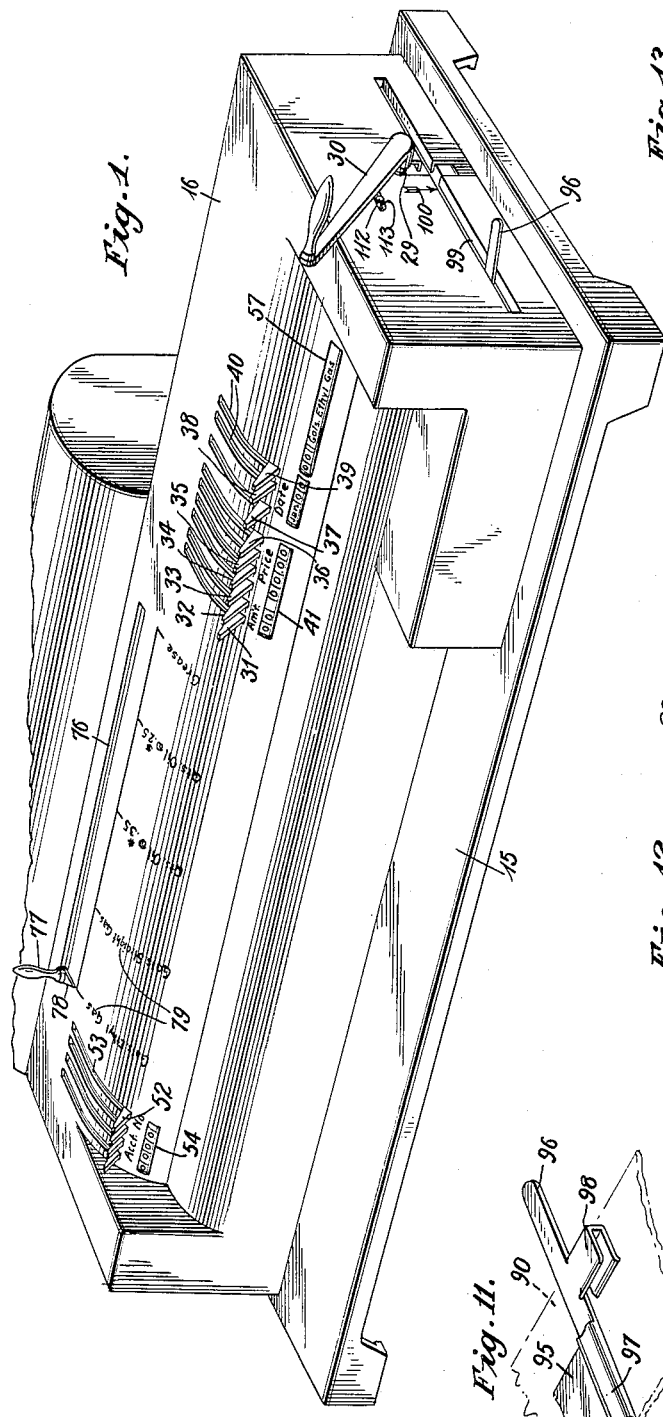
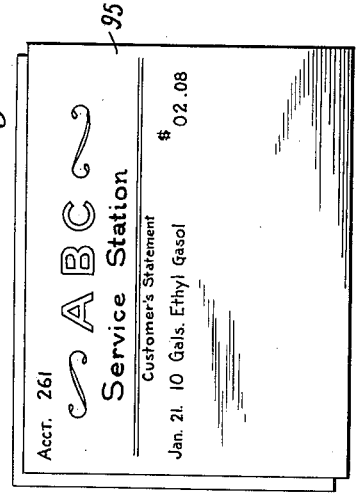
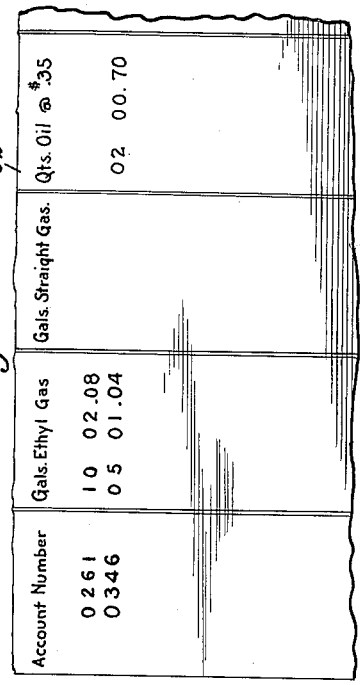
Inventor
William I. Nicholson, Jr.

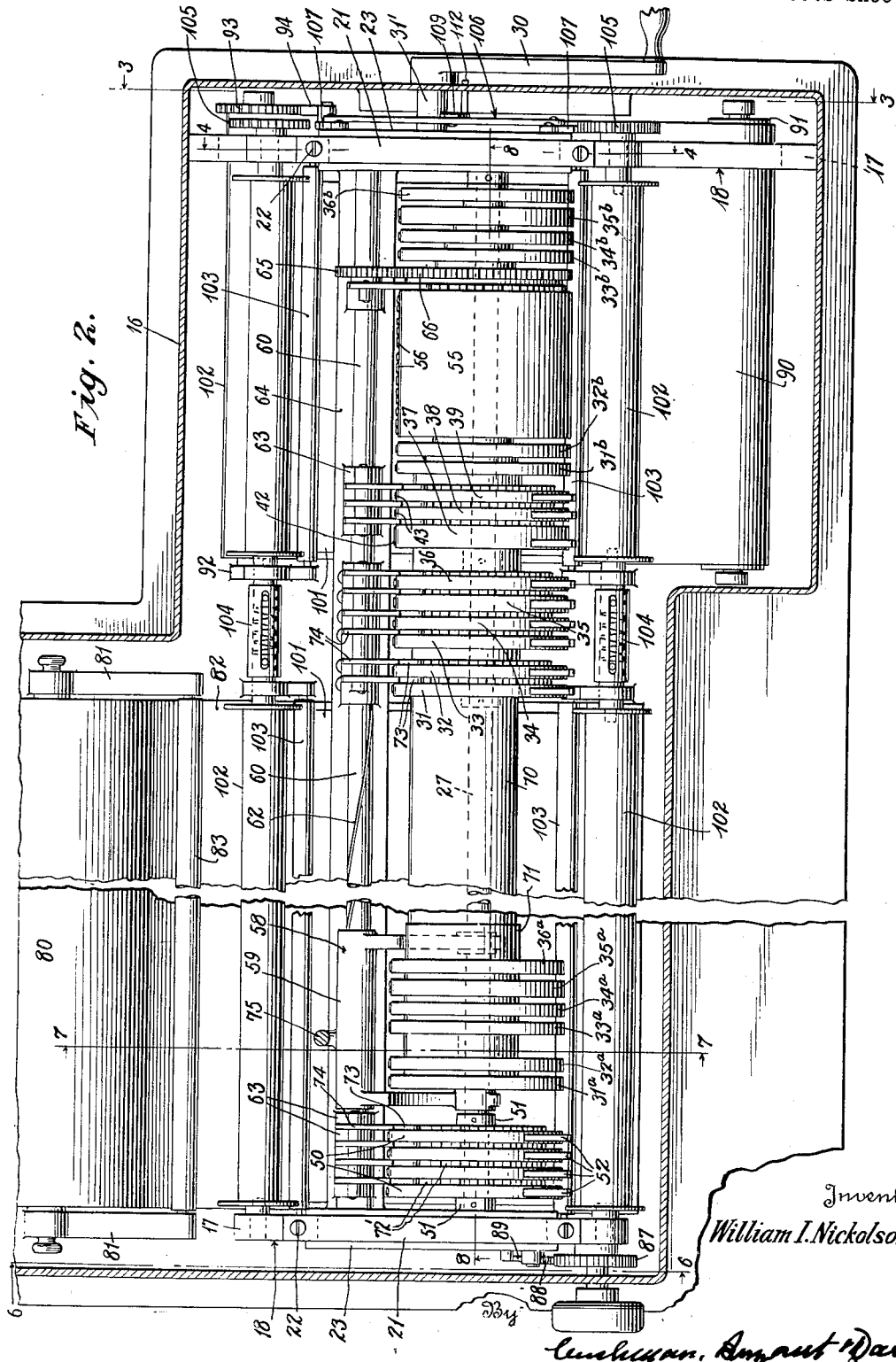

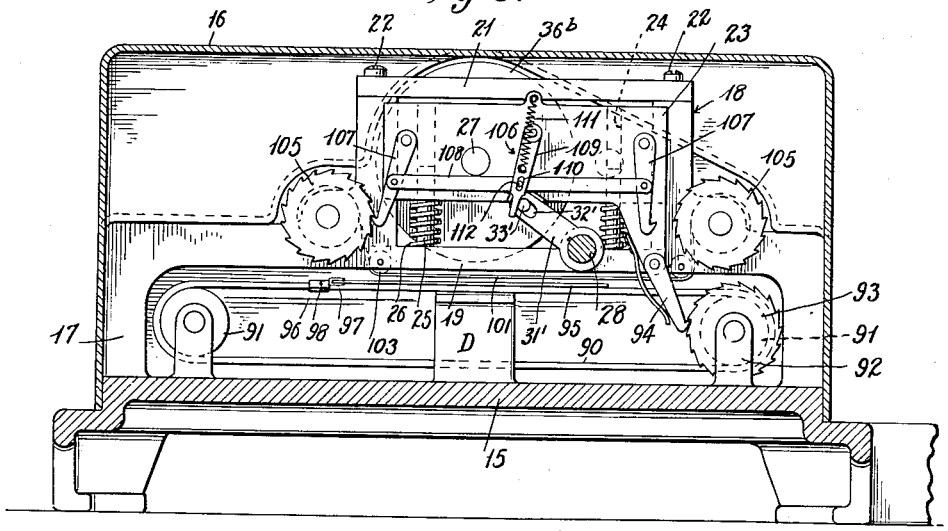
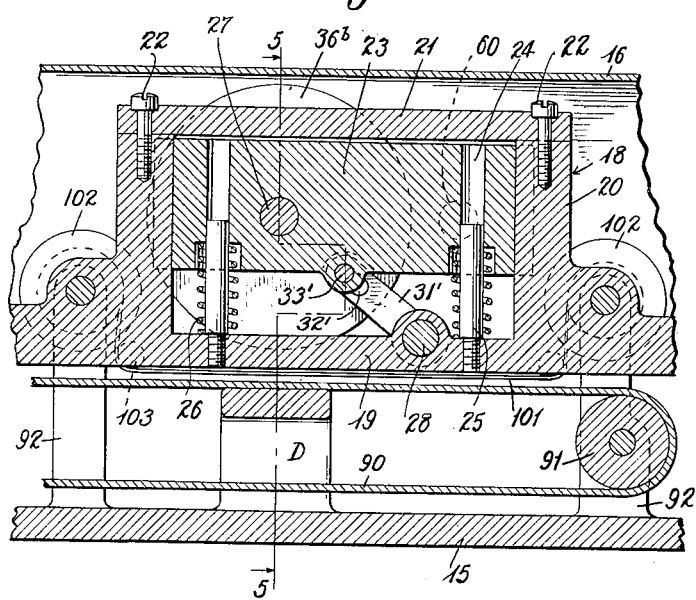
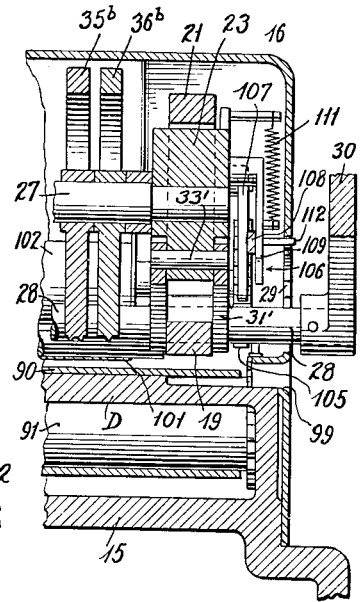

Inventor
William I. Nickolson, Jr.

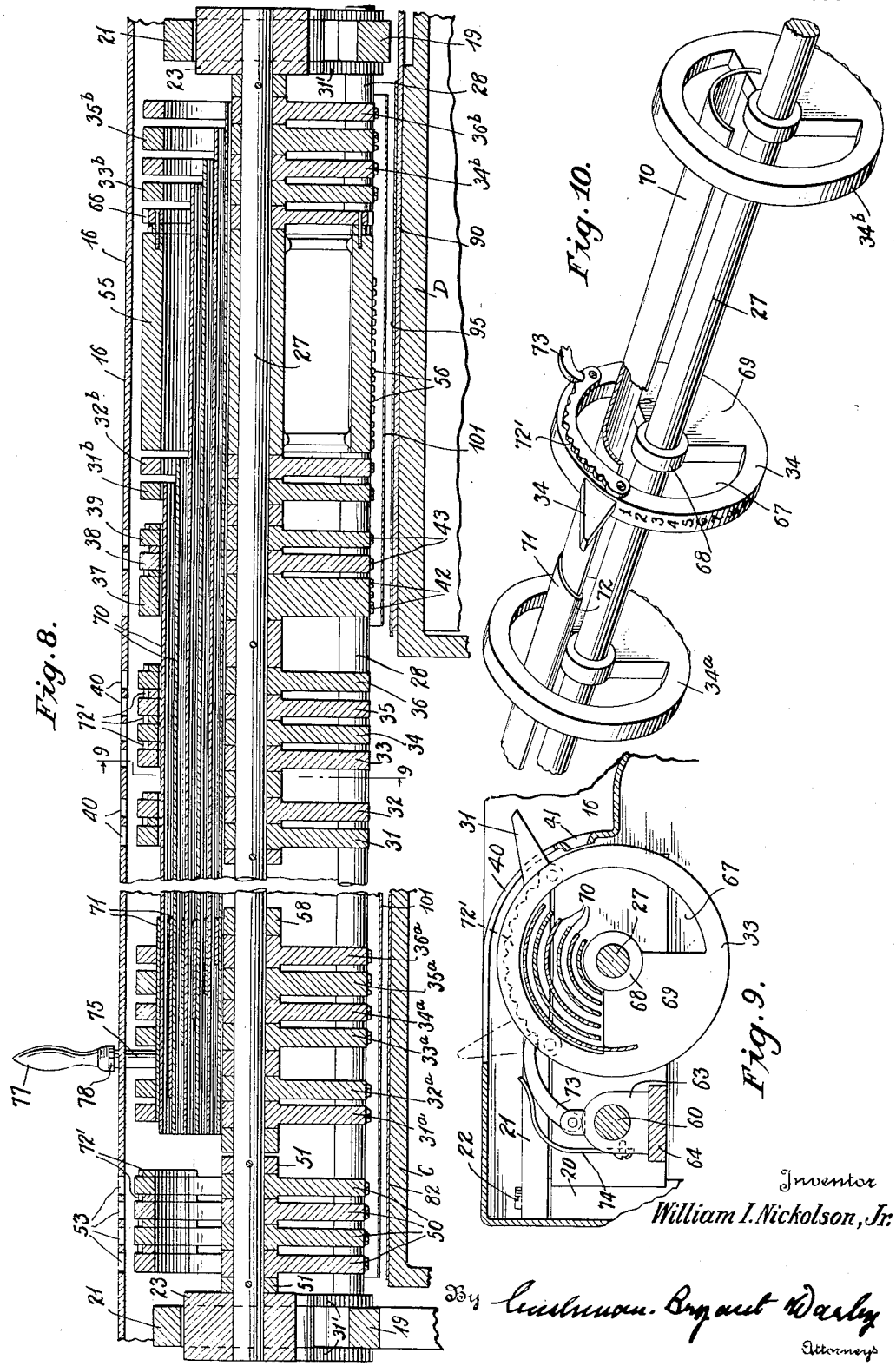

Patented Feb. 6, 1934

1,945,655

UNITED STATES PATENT OFFICE 1,945,655

SALES AND BILLING MACHINE

William I. Nicholson, Jr., Tulsa, Okla.

Application March 27, 1931, Serial No. 525,768
Renewed April 25, 1933

15 Claims. (Cl. 101—96)

This invention relates to new and useful improvements in machines for making records in duplicate, triplicate, or more, and all simultaneously at the time of the transaction to obviate a large amount of bookkeeping for various customer's accounts, and is especially adaptable in businesses where monthly accounts are payable in full.

An important object of the invention is to provide a machine of the above character, which may be termed a sales and billing machine, in which is provided a sales sheet or strip to carry notations of all sales transacted and recorded by the machine, and a mechanism for making a duplicate record of such sales on individual account sheets separately insertable in the machine and upon which a duplicate record of the sale recorded on the main sales sheet is entered. For this purpose, two sets of type carriers are simultaneously set in proper corresponding recording positions from a common operating or setting mechanism, and in order to provide for entering a transaction in the proper column of the sales record and the corresponding transaction by name in the customer's account record, setting means, separate and independent of the main operating or setting means, are provided, which will also simultaneously set the type carriers for recording the transaction item in each record.

Another important object of the invention is to simplify the mechanism for accomplishing these objects, especially by mounting all of the type carriers of both recording mechanisms on the same axis and by providing for the rectilinear movement of this axis to cause both recording mechanisms to simultaneously imprint upon both records.

A further object of the invention is to provide record material feeding means which are automatically operable by the machine to effect a proper line spacing of the two accounts so that subsequent entries will be made on the record material immediately below the preceding entries without any manual attention to this phase of the operation.

A still further object of the invention is to provide a movable surface for proper line spacing on the customer's record, and means enabling such records to be readily attached to or detached from said movable surface, which account sheets are filed away preferably in a visible index holder whence they are readily available for insertion into the machine.

Another object of the invention is to provide indicating means by which the customer's records can be introduced into the machine in proper position to receive an entry from the set of type carriers.

Other objects and advantages of the invention will become apparent during the course of the following description.

In the accompanying drawings, forming a part of the descriptive matter, and wherein like numerals are employed to designate like parts throughout the several views, Figure 1 is a perspective view of the machine showing its outward appearance.

Figure 2 is an enlarged horizontal section through the same.

Figure 3 is a transverse vertical section through the same taken on the line 3—3 of Figure 2.

Figure 4 is a similar view taken on the line 4—4 of Figure 2.

Figure 5 is an enlarged fragmentary longitudinal section taken on the line 5—5 of Figure 4.

Figure 8 is an enlarged longitudinal vertical section taken on the line 8—8 of Figure 2.

Figure 9 is a vertical transverse section taken on the line 9—9 of Figure 8.

Figure 10 is an enlarged perspective view showing three of the related type carriers interconnected for simultaneous turning movement and for relative longitudinal adjustment.

Figure 11 is an enlarged perspective view of the clip for attaching the customer's account sheet to the movable web.

Figure 12 is an enlarged fragmentary plan of a portion of the sales sheet, and

Figure 13 is a perspective view of a customer's account sheet or form.

Figure 6:
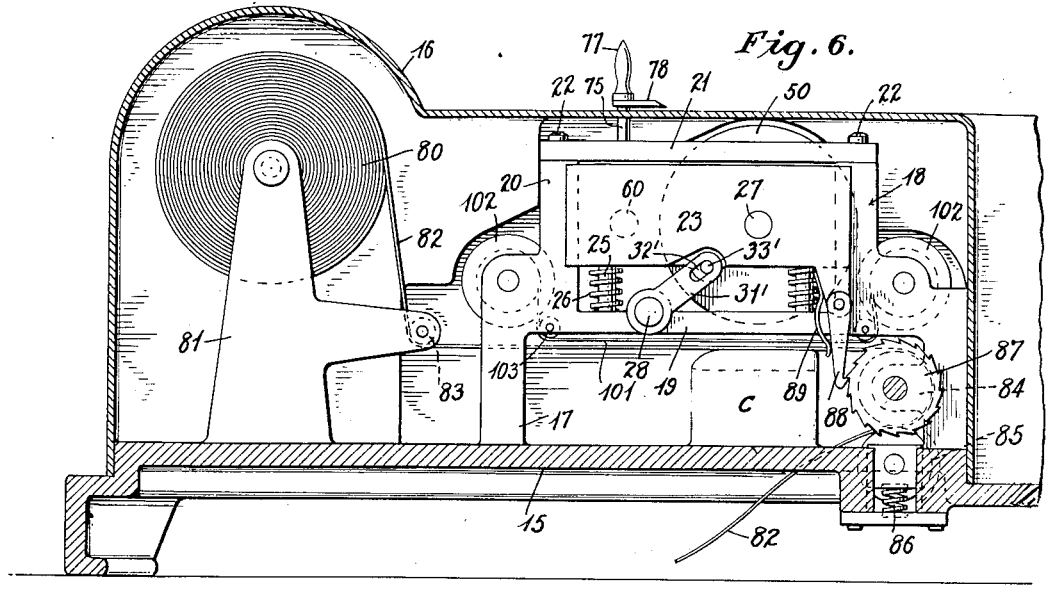
Figure 6 is a transverse vertical section taken on the line 6—6 of Figure 2 at the opposite end of the machine.

Referring now more particularly to the drawings for a detailed explanation of the mechanism which discloses one form which the invention may assume, and is therefore to be considered as simply one example of the invention, the numeral 15 designates a base which supports the various parts of the mechanism as well as a housing 16 which encloses the mechanism disposed upon the base. Rising from the base within the housing at opposite ends thereof are legs or pedestals 17 supporting a guide frame 18 at each end of the base in vertically spaced relation thereto. Each guide frame includes a base 19 from which rise a pair of spaced guide arms 20 which are bridged at their upper ends by a cap bar 21 secured thereto by the machine screws 22. Vertically slidable in each guide frame 18 and engaging the spaced guide arms 20 is a vertically movable head or block 23 having a pair of vertical openings 24 to slidably receive vertically arranged pins 28 extending from the base 19. Coil springs 26 surround each guide pin between the base 19 and countersinks in the bottom of the vertically movable blocks 23 to cushion the descent of the blocks and to normally retain them in elevated positions. These vertically movable heads mount the ends of a shaft 27 upon which type carriers, to be presently described, are rotatably mounted. In order to depress the heads 23 to carry a shaft 27 and type carriers to printing position, a horizontal shaft 28 extends longitudinally of the machine and is journaled in bearings in the base 19 of the guide frame to extend through a vertical slot 29 in one end of the housing 16 where it is equipped with a hand crank 30 for oscillating the same. This shaft 28 at opposite ends of the guide frame is provided with a pair of spaced crank arms 31' having their outer ends slotted as at 32' to receive the ends of a connecting pin 33 projecting on opposite sides of the vertically movable head 23. The shaft 28 being arranged off center with respect to the vertical center of the heads 23 causes the crank arms 31 to pull downwardly upon the heads 23 against the tension of the springs 26 when the hand crank 30 is turned in a counterclockwise direction. On release of the hand crank, springs 26 will return the heads 23 to their raised normal positions as shown in Figure 4.

*Printing mechanism*

As stated previously, the shaft 27 forms a mounting for the various type carriers. A set of type carriers is mounted upon the opposite sides of the center of the shaft 27, one for the sales record at the left hand end of the shaft, and one for the customer's account record at the right hand end of the shaft. Between these two sets of type carriers is an operating mechanism for correspondingly setting the carriers of each set. This operating mechanism comprises a plurality of discs freely rotatable upon the central portion of the shaft 27. The discs 31 and 32 are for setting up the quantity up to ninety-nine in both sets of type carrires at the ends of the shaft. The discs 33, 34, 35 and 36 are for setting up the price in both sets of carriers, while the discs 37, 38 and 39 are for setting up the date, by month and day, in the customer's recording mechanism. Each of these nine discs is provided with a finger piece extending substantially radially from its outer periphery and is numbered to correspond with the numeral of its respective disc. These finger pieces project through slots 40 in the top of the housing 16 and are adapted to be moved rearwardly therethrough for setting the two sets of type carriers, as will be presently described. The periphery of each of the discs 31 to 36 inclusive and 38 and 39 is equipped with consecutively arranged numerals 1 to 0, as best shown in Figure 10, to be visible through sight openings 41 provided in the front of the housing 16 so that the operator may determine whether the discs have been accurately set by manipulation of the finger pieces. The periphery of the date disc 37 is equipped with a consecutive arrangement of the months abbreviated, and at diametrically opposite points with raised type 42 corresponding with the month designations so that when this disc is set and indicates any particular month through the sight opening, the corresponding month type 42 will be arranged immediately beneath the axis of the shaft 27 in printing position. Likewise, the date discs 38 and 39, which are provided with numerical designations as hereinbefore described, are also provided on their peripheries with type face 43 corresponding to the numerical arrangement visible through the sight opening in the housing. The sales account printing mechanism includes a set of six discs 31a to 36a inclusive, corresponding with and set in printing position by means of the setting discs 31 to 36 inclusive. Each of these discs 31a to 36a inclusive are provided on their peripheries with consecutively arranged type 1 to 0, and are adapted to print with the discs 31a to 32a the quantity, while the discs 33a to 36a are adapted to print the price thereof. These discs, like their corresponding setting discs, are loosely mounted upon the shaft 27 but are also movable longitudinally thereof for columnar setting with respect to the sales record material. The sales record printing mechanism also includes four corresponding printing discs or type carriers 50 freely rotatable upon the shaft 27 between a pair of thrust collars 51. Each of these discs 50 also is provided on its periphery with a series of consecutively arranged printing type numerals 1 to 0, and a finger piece 52 which projects through a slot 53 in the top of the housing 16 in the same manner as the finger pieces 31 to 39 inclusive. A sight opening 54 is provided in the front of the housing immediately beneath the forward ends of the slots 53 so as to render visible, consecutively arranged indicating numerals provided on the peripheries of the discs to correspond with their respective printing type. This group of four type carriers is designed to impress the sales record material with the number of the account in which the transaction is to be recorded.

The customer's account record is adapted to be imprinted by the date type carriers or discs 42, 43, as well as with quantity and price, by the discs 31b to 36b inclusive. This latter group of printing discs corresponds exactly with the discs 31a to 36a and have the same raised printing characters disposed on their peripheries. The discs of the "b" group of type carriers are not arranged in closely juxtaposed relation, but the discs 31b and 32b, representing the quantity, are spaced a substantial distance from the four discs 33b to 36b inclusive representing the price, and all of them are independently rotatable upon the shaft 27. Loosely mounted upon this shaft and interposed between the two groups of discs constituting the "b" group, is a drum 55 having disposed on its periphery, printing type arranged in descriptive legends 56 descriptive of the various commodities intended to be recorded by the machine. Corresponding descriptive legends, not of printing type, are also arranged in consecutive order on the periphery of the drum opposite corresponding legends constituted by the printing type so as to be visible through a sight opening 57 in the front of the housing 16 whereby the operator can determine whether the proper descriptive legend composed of type is disposed in its proper printing position.

The rotary position of this drum 55 is determined by the longitudinal positioning of the type carriers "a" of the sales recording mechanism in being moved to various positions to cause their impressions being made on the sales record material in the proper column. The mechanism provided for accomplishing this purpose consists of a yoke 58 straddling the group "a" type carriers and slidably mounted upon the shaft 27. This yoke is equipped with a sleeve portion 59 slidably mounted upon a rotary shaft 60 and is provided with a projection 61 adapted to operate in a spiral groove 62 in the shaft 60 for the purpose of turning the latter as the yoke is moved longitudinally of the shaft 27. This shaft is journaled in a series of spaced bearings 63 upstanding from a bar 64 extending from one guide frame 20 at one end of the machine to the other at the opposite end. As best appreciated from Figure 2, the shaft 60 parallels the shaft 27 and at a point just beyond the drum 55 is provided with a pinion 65 which meshes with a gear 66 secured to an end face of the drum. Consequently, it will be evident that movement of the yoke 58 with the group "a" type carriers longitudinally of the shaft 27 causes rotation of the shaft 60 and rotation of the drum 55 by means of the gears 65 and 66, thereby causing the legend 56 on the drum, which corresponds to the title of the column on the sales record in which the "a" carriers are arranged to print, to be disposed in position to imprint upon the customer's account sheet when the shaft 27 is depressed by means of the hand crank 30.

To cause simultaneous rotary adjustment of the groups of type carriers "a" and "b" by the adjustments of the main operating discs 31 to 36 inclusive, nested telescopic means are provided to connect these three corresponding sets or series of discs. In order to provide for the concentric arrangement of this connecting means, a segment of approximately two-thirds of the circumference of each disc comprising these three groups, is removed as at 67, leaving each disc generally of ring-like form connected to its hub portion 68 by means of a solid spoke construction 69, as best appreciated from Figure 10. Arcuate strips or bars 70 concentric with the shaft 27, extend through the segmental openings 67 of the three sets of discs and are secured at one longitudinal edge to corresponding discs of the main operating mechanism and the "b" group of type carriers. These arcuate bars 70 extend concentrically through the cut-out segment 67 for a distance of approximately one-third the circumference of its respective disc, leaving the other one-third of the segmental space open for the movement of the disc during adjustments thereof. Moreover, it will be noted that these segmental connecting bars 70 are arranged at different distances from the center of the disc so that no one interferes with the operation of the other, being arranged in the nested relation shown in Figure 9.

Figure 7:
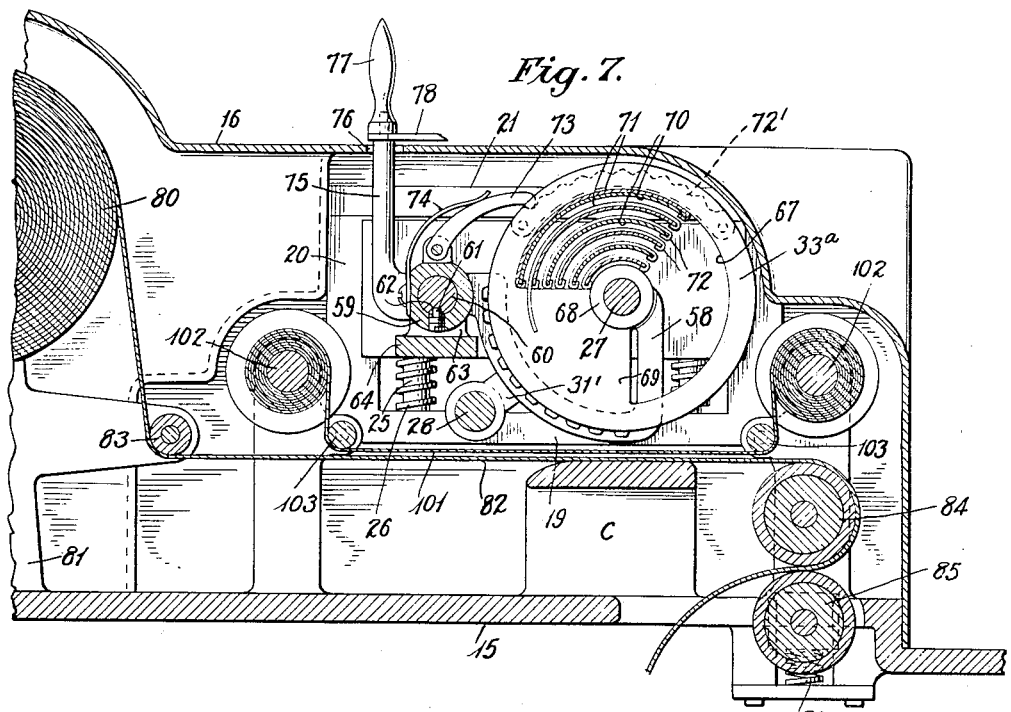
Figure 7 is a corresponding view taken on the line 7—7 of Figure 2.

Due to the fact that the "a" group of type carriers moves longitudinally of the shaft 27 and relative to the main operating discs 31 to 36 inclusive, provision must be made for the same as well as rotary adjustment corresponding to the adjustments imparted to the "b" group by means of the main operating discs. This is accomplished by making the bars 70 telescopic and providing a telescopic section 71 to receive its respective bar 70 whereby they can be adjusted longitudinally. These telescopic sections 71 are, of course, of arcuate configuration to correspond with the bars 70 and are secured to the edges of the spokes 69 in the same nested relationship as their complementary bars 70. In this manner, it will be evident that the discs 31, 31a, and 31b are interconnected in such a manner that turning movement of any of the main operating discs will cause corresponding turning movement of the type carriers of the two groups "a" and "b". Means are provided for releasably retaining the operating discs 31 to 36 inclusive and consequently the type carriers of the groups "a" and "b" from accidentally turning from their proper printing positions, here illustrated in the form of segmental ratchet bars 72' secured to the side face of each operating disc. A dog 73 for each operating disc is pivotally mounted on the bearing 63 and is resiliently held in engagement with the ratchet 72' by means of a flat bowed spring 74, as clearly shown in Figures 7 and 9. Similar spring-pressed detents and ratchet segments are provided for the type carriers 50 representing the account number, and the date type carriers 37 to 39 for the customer's account record.

Means for moving group "a" type carriers longitudinally of the shaft 27 to dispose them above the proper column of the sales record, consist of a projection 75 of the yoke 58, extending vertically through an elongated slot 76 extending longitudinally in the front of the housing 16, and terminating in a handle portion 77 arranged sufficiently above the casing so as not to interfere with printing movement of the printing mechanism. A pointer 78 extends laterally from the handle 77 over the casing so as to point to indications 79 designating the character of the commodity entering the transaction so as to assure the printing mechanism for the sales record being disposed above the proper column of the sales sheet shown in Figure 12. Setting the pointer opposite any of the designations 79, through the mechanism heretofore described, sets the indicating indicia on the drum 55 corresponding to the designation 79 in a position to be viewed through the sight opening 57 in the housing. As stated previously, this adjustment of the mechanism turns the drum 55 to dispose in printing position, a legend type corresponding to the legend 79 opposite which the pointer is positioned.

For brevity, the type carriers 31a to 36a and 50 are designated by the letter "A" to indicate the printing mechanism for the sales sheet, while the type carriers 31b to 36b inclusive, 37 to 39 inclusive, and 55, constitute the printing mechanism for the customer's account record and are designated under one heading "B".

Stationary platens C and D are provided on the base of the machine respectively for the two groups "A" and "B" type carriers directly beneath the same. The sales record material in the form of a roll of material 80 is rotatably supported upon standards 81 rising from the base and within the housing 16 back of the platen C. Strip material 82, a portion of which is shown in Figure 12, provided with the necessary columns having suitable headings, is directed from the roll 80 down and under a guide roll 83, thence horizontally across the surface of the platen C, and then around and between a pair of feed rollers 84 and 85 from whence it is directed to a point of deposit beneath the machine and into a suitable receptacle or upon a suitable storage roller not shown. The feed rollers 84 and 85 are frictionally pressed together by means of coil springs 86 placed beneath the journals of the lower roller 85. The upper feed roller 84 is equipped with a ratchet wheel 87 adapted to be engaged by a spring pressed pawl 88 pivotally suspended from one of the slidable blocks 23 and normally pressed into engagement with the ratchet by means of a flat bowed spring 89. In view of this arrangement, it will be obvious that upon each vertical movement of the head 23 the pawl 88 will engage the ratchet wheel 87 and turn the feeding roller 84 through a distance sufficient to move the sales strip 82 a distance equal to one line of spacing.

The means for moving the customer's account record step by step across a platen D consists of an endless web 90 trained about a pair of spaced reels 91 journaled in bearings 92 rising from the base 15 of the mechanism. One of these reels is equipped with a ratchet wheel 93 adapted to be turned step by step by a spring-pressed pawl 94 pivotally suspended from the end block 23 adjacent the customer's account recording mechanism.

A customer's account record preferably consists of a blank 95, such as shown in Figure 13, which may be perforated along one edge and folded so that carbon paper can be inserted between the two sheets to produce the customer's account in multiple. These customer's account sheets are preferably filed in a visible index and in order to secure them to the web 90 to partake of its step by step movement, a clip such as shown in Figure 11 is provided. This clip is provided with a handle portion 96, one end of which is folded upon itself as at 97 to provide a pair of spring jaws for frictionally gripping the lower edge of the customer's account sheet. The clip is also provided with a laterally projecting clip 98 having a pair of jaws formed by folding the material upon itself, as shown, which are adapted to frictionally grip one longitudinal edge of the web 90. The customer's account is inserted in proper position beneath the type carriers constituting the customer's printing mechanism, by introducing the customer's account and spring clip through an elongated horizontal slot 99 in the end wall of the housing 16 beneath the crank handle 30. An indicating legend 100 is provided on the end wall of the housing so as to designate the line of the customer's account sheet which should be aligned therewith to receive the impression from the printing mechanism. With this as a guide, the clip is inserted with the card through the slot and the spring jaws 98 engaged with the edge of the web 90. The upper run of this web carries a customer's account sheet across the platen D in step by step relation to secure line spacing of the various items entered on the sheet.

In order that the type on the type carriers can make a clear impression upon the two sheets of record material, a reversible ribbon feed is provided and an inking ribbon 101 is automatically moved step by step across the platen and above the record material constituting each record. A pair of ribbon rollers 102 are provided for each ribbon so that the same may be wound from one to the other, and guide rollers 103 are journaled in the guide frames 18 to guide the ribbon horizontally across the face of the platen. These ribbon rollers are readily removable and are coupled with a spring coupling 104 so that movement of a roller of one ribbon mechanism will actuate a roller of the other ribbon mechanism, securing simultaneous movement thereof and a fresh ribbon surface for each impression made upon the sales and customer's account records. This automatic movement of the ribbons is accomplished by providing the rollers 102 on the customer's account side of the machine with ratchet wheels 105 and a reversible pawl arrangement indicated in general by the numeral 106. This pawl arrangement comprises a pawl 107 for each ratchet wheel 105 and these pawls are pivotally connected by a bar 108 which permits of only one pawl being disposed in operative position at a time. This bar 108 is urged in one direction or the other by means of a lever 109 pivotally suspended from one of the blocks 23 and pivotally and slidably associated with the medial portion of the bar 108 by means of a pin and slot connection 110. A tension spring 111 is secured to the upper portion of the block 23 at its upper end and at its lower end is connected to the lever 109 at a point below its pivotal suspension so that this spring is tensioned on either one side of the axis of the lever 109 or the other. This lever or the bar 108 may be provided with a projection 112 which extends through a slot 113 in the end wall of the casing so that the ribbon ratchet mechanism can be reversed at will to cause movement of the ribbons in one direction or the other.

From the foregoing description, it will be evident as to how a customer's account record can be introduced into the machine for an entry and the sales record being always disposed in proper position with respect to the machine, no attention thereto is required. To make an entry on the sales record and have it duplicated on the customer's account record, the operating fingers 52 of the type carriers 50 are actuated to place the number of the customer's account in proper position for printing upon depression of the shaft 27. Next, the item giving the name of the commodity purchased is set for recordation on both the sales record and the customer's account by moving the handle 77 so that its pointer will be arranged opposite a legend on the exterior of the casing 16. This will place the type carriers of the group "a" above the proper enumerated column of the sales record sheet 82 and simultaneously will turn the drum 55 so as to dispose type 56 corresponding to the legend 79 opposite which the pointer has been arranged, lowermost and in printing position. The corresponding legend will appear from the drum 55 through the sight opening 57. The next step is to set the control dials 30 to 36 to indicate the quantity and price of the item purchased. This is done by manipulation of the finger pieces 31 to 39 inclusive, which sets the type carriers indicating quantity and price of the groups "a" and "b" in identically the same position so as to enter exactly the same quantity and price on both records. The date of the transaction is entered on the customer's account record by operation of the finger pieces 37 to 39, thereby placing the type carriers 42 and 43 in proper position for printing the date on the customer's account record 95, which is detachably clipped to the traveling web 90 as hereinbefore disclosed.

Having thus set the machine for duplicating the entry on both records, the crank handle 30 is manipulated to cause depression of the heads 23 in their guide frames 18 carrying with them the shaft 27 and all type carriers. The type presented lowermost on all of the carriers is thus pressed into engagement with the ribbons and the proper impression is made upon the record material arranged across the platens C and D. Upon release of the crank handle, the type carriers will be automatically elevated out of engagement with the record material, and at the same time the two records are automatically line spaced so as to be in proper position for the entry of a second item if more than one item is to be entered. If only one item is entered, the customer's account record is then withdrawn by means of the clip 96 and placed in the visible index for future reference. The sales record, of course, remains in the machine, and monthly may be inspected for balancing accounts and, as will be obvious, each customer's account may be promptly mailed out at the end of the month, since all that is to be done is to add the various amounts contained thereon and totalize the same.

It is to be understood that various changes in the various parts of the mechanism may be resorted to without departing from the scope of the appended claims.

I claim:

1. In duplicate record mechanism, two series of corresponding printing discs, a series of operating discs disposed between the same and corresponding with each series, and means connecting corresponding discs of the three series and arranged concentrically thereof.

2. In duplicate record mechanism, two series of corresponding printing discs, a series of operating discs disposed between the same and corresponding with each series, and concentrically arranged elements connecting corresponding discs of the three series.

3. In duplicate record mechanism, two series of corresponding printing discs having sector shaped openings, a series of operating discs disposed between the two series of printing discs and having openings corresponding with those of the printing discs, and concentrically arranged elements extending through the openings of said printing and operating discs and connected to corresponding discs of the three series at corresponding distances from the centers thereof.

4. In duplicate record mechanism, two series of corresponding printing discs, a series of operating discs disposed between the same and corresponding with each series, and telescopic elements connecting corresponding discs of the three series whereby one series can be moved relative to others for columnar printing.

5. In a duplicate record mechanism two sets of of co-axial type carriers, a carrier of one set being axially movable for columnar adjustments, a carrier of the other set being relatively rotatably movable, and operating means common to both sets for simultaneously setting the sets correspondingly.

6. In a duplicate record mechanism, two sets of co-axial type carriers, a carrier of one set being axially movable for columnar adjustments, a carrier of the other set being relatively rotatably movable, operating means common to both sets for simultaneously setting corresponding carriers of both sets correspondingly, and operating means connecting the relatively movable carriers of the two sets for simultaneously moving the same for columnar adjustments.

7. In a duplicate record mechanism, two sets of co-axial type carriers, a carrier of one set being axially movable for columnar adjustments, a carrier of the other set being relatively rotatably movable, operating means common to both sets for simultaneously setting corresponding carriers of both sets correspondingly, a shaft having a spiral groove, a member engaging said groove and being movable longitudinally of the shaft for axially adjusting said carrier, and a pinion on said shaft engaging said rotary carrier for turning the same a distance corresponding to the lineal movement of the axially movable carrier.

8. In a duplicate record mechanism, a type carrier movable to and from printing position, a platen, an intermittently movable web operated by movement of said carrier from printing position to effect line spacing, and means for detachably attaching record material to said web.

9. In a duplicate record mechanism, a type carrier movable to and from printing position, a platen, an intermittently movable web operated by movement of said carrier from printing position to effect line spacing, and a clip adapted to frictionally engage an edge of said web and an edge of record material for detachably securing the latter to the web.

10. In a duplicate record mechanism, a guide frame, a pair of heads slidably mounted therein, a printing shaft mounted at its ends in said heads, printing discs rotatably mounted on the shaft, an operating shaft journaled in said frame, and means carried by said operating shaft and engaging said heads for depressing the latter to cause corresponding movement of said discs to printing position.

11. In a duplicate record mechanism, a guide frame, a pair of heads slidably mounted therein, means to cushion the descent of said heads, a printing shaft mounted at its ends in said heads, printing discs rotatably mounted on the shaft, an operating shaft journaled in said frame, and means carried by said operating shaft and engaging said heads for depressing the latter to cause corresponding movement of said discs to printing position.

12. In a duplicate record mechanism, a vertically movable printing shaft, two sets of simultaneously adjustable type carriers mounted thereon, a platen for each set of carriers, ribbon means for each platen automatically operated by the vertical movements of said shaft, a web movable across each platen, and means for operating said shaft to simultaneously move the carriers into printing engagement with said webs.

13. In a duplicate record mechanism, two sets of co-axial type carriers, a carrier of one set being axially movable for columnar adjustments, a carrier of the other set being relatively rotatably movable, operating means common to both sets for simultaneously setting corresponding carriers of both sets correspondingly, a shaft having a spiral groove, a yoke slidable on said shaft and embracing carriers of one set to move the same longitudinally thereof, said yoke engaging said groove, and a pinion on said shaft engaging said rotary carrier for turning the same a distance corresponding to the lineal movement of the axially movable carrier.

14. In a duplicate record mechanism, a housing, a guide frame therein, a pair of heads slidably mounted therein, a shaft mounted at its ends in said heads, printing discs rotatably mounted on the shaft, an operating shaft journaled in said frame and projecting through said housing, an operating crank on the exterior end of said operating shaft, and cranks connecting said operating shaft with said heads.

15. In a duplicate record mechanism, a housing having a longitudinally extending slot, two sets of coaxial type carriers, a carrier of one set being axially movable for columnar adjustment, a carrier of the other set being relatively rotatably movable, a shaft having a spiral groove, a yoke slidable on said shaft and embracing carriers of one set to move the same longitudinally thereof, said yoke engaging said groove, said yoke having a handle projection extending through said longitudinal slot in the housing, and a pinion on said shaft engaging said rotatable carrier for turning the same a distance corresponding to the lineal movement of the axial movable carrier.

WILLIAM I. NICHOLSON, Jr.